June 19, 1928.
S. M. VIELE
1,674,490
METHOD OF AND APPARATUS FOR CONTROLLING THE
SPEED OF FLUID ACTUATED ENGINES
Filed Feb. 2, 1925
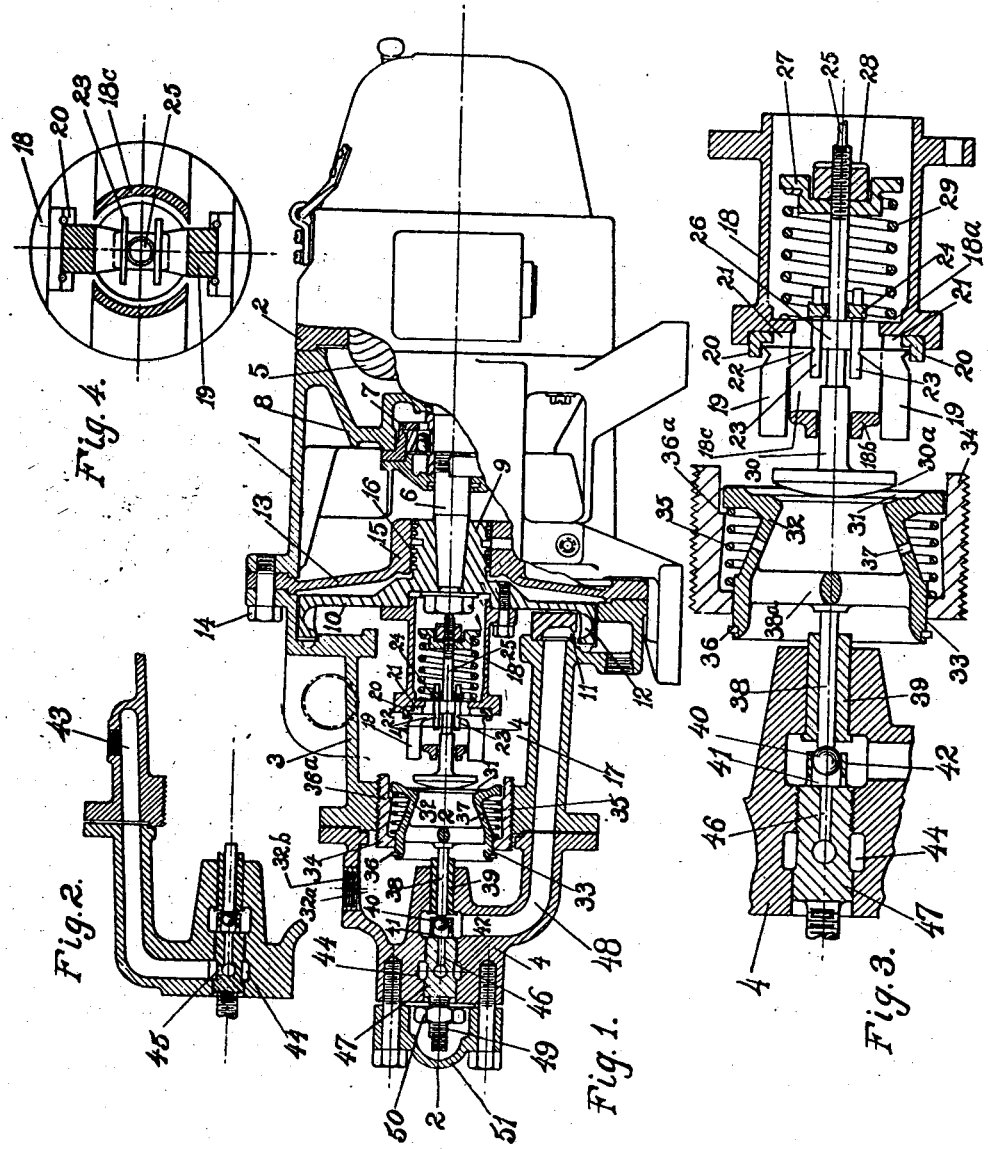
Inventor
Sylvester M. Viele Patented June 19, 1928.

1,674,490

UNITED STATES PATENT OFFICE.

SYLVESTER M. VIELE, OF ALTOONA, PENNSYLVANIA.

METHOD OF AND APPARATUS FOR CONTROLLING THE SPEED OF FLUID-ACTUATED ENGINES.

Application filed February 2, 1925. Serial No. 6,343.

Difficulty has been experienced in controlling fluid actuated engines subjected to such service as are the engines driving the generators for head-lights of locomotives. Here the high speed engine is desirable and high-pressure steam is usually used. Various devices have been designed for controlling the speed of such engines but there are disadvantages as to most, if not all, of such devices. One of the difficulties has been the proper lubrication of the communicating parts of the speed sensitive mechanism under conditions of service. Other devices giving less difficulty as to lubrication are not economical. In carrying out my present invention I utilize the exhaust pressure as an element in controlling the speed and control the exhaust pressure through a speed sensitive mechanism which accomplishes its function without a rubbing contact between the rotating parts and stationary parts. Thus I am able to avoid the lubrication troubles which have been heretofore encountered. In carrying forward my invention, particularly in the line of economy, I utilize the variations of exhaust pressure for controlling the inlet passages so that while the functioning of the device is dependent upon the exhaust pressure the actual control is accomplished through the control of the inlet. As a feature of my invention I house the speed sensitive mechanism within the steam passages themselves and this, particularly in relation to a turbine avoids the necessity for glands or packing between the speed sensitive element and the control valve. Thus a very sensitive and lighter mechanism may be used. Other features and details of the invention will appear from the specification and claims.

The apparatus forming the subject matter of the invention and by which the method may be accomplished is illustrated in the accompanying drawings as follows:—

Fig. 1 shows a side elevation, partly in section, of a head-light engine.

Fig. 2 a section of a portion of the mechanism on the line 2—2 in Fig. 1.

Fig. 3 an enlarged view of the controlling mechanism, the section being similar to that shown in Fig. 1.

Fig. 4 a section on the line 4—4 in Fig. 1.

1 marks the frame. This has the generator frame extension 2 at one end and the exhaust chamber shell 3 secured to the opposite end. The control valve body 4 is secured to the end of an exhaust chamber shell 3. A generator frame 5 is mounted on the extension 2 in the usual manner and is designed to furnish current in the present embodiment to a head-light. A shaft 6 communicates movement to the generator and is in continuation with, or coupled with an armature shaft of the generator and is arranged in the ball bearings 7 carried in a web 8 of the frame. The shaft 6 extends into and is locked with the hub 9 of the rotor 10 of the turbine. 11 and 12 mark the nozzle and reversing chamber operating in connection with the rotor in the usual manner. A cover plate 13 is secured between the shell 3 and the frame 1, the bolts 14 extending from the shell 3 to the frame 1 clamping the cover plate 13 between them. The cover plate has the bearing 15 and this bearing is provided with the usual sealing grooves 16 and rings.

The exhaust chamber 17 within the shell 3 receives the exhaust from the rotor. The speed sensitive mechanism is arranged in this chamber and comprises the frame 18 which is secured to and extends axially from the rotor 10. Centrifugal weights 19 are mounted on the end of the frame. They have the knife-edge pivotal bearings 20 operating in notches 21 provided at the end of the frame 18. A bell crank extension 22 on the weights engages links 23 which extend from the centrifugal weights to a cross head 24 slidingly mounted on a stem 25 extending axially within the frame and resting normally against a shoulder 26 on the stem. The stem extends through a head 27 and a nut 28 is arranged on the end of the stem securing the head thereon. A spring 29 rests on a seat 18ª in the frame and exerts its pressure against head 27. This spring forms the centripetal element of the speed sensitive device as opposed to the centrifugal element formed by the centrifugal weights 19, these parts operating in the ordinary manner of centrifugal speed sensitive devices.

The stem 25 has a forward extension 30 carrying the control valve 30ª. The extension 30 operates through a guide block 18ᵇ carried by arms 18ᶜ extending from the frame 18. The valve operates over a valve passage 31 but it is not in its widest range seated.

The operation of the structure where the control of the speed is entirely by the exhaust is as follows: As the engine starts, the centrifugal weights are at their inner position and the valve 30ª at its extreme open position. Thus there is no appreciable resistance to the outflow of the exhaust through the valve opening and consequently no reduction of speed of the engine incident to the choking of the exhaust. If, however, the speed rises above that desired the speed sensitive element through the preponderance of force of the weights operates to close the valve more or less and this creates a back pressure of exhaust with a consequent reduction in speed of the engine. It will be noted that this is accomplished without contact of rotating parts of the speed sensitive device and the stationary parts of the frame, in this instance the valve seat. In the mode of controlling the speed as far as described, there is, of course, more or less loss due to the choking of the exhaust in accomplishing this control. In order to minimize the loss I prefer to supplement the control of the exhaust and utilize the variation in exhaust to control the steam supply. Where this is done a very wide range of control may be accomplished with a very small change in the exhaust pressure and consequently with very desirable economy.

The exhaust passage extends through a sleeve 32, chamber 32ª and passage 32ᵇ. This sleeve has a cylindrical part 33 forming a sliding fit with a bushing 34, the bushing being screwed into the end of the shell 3. The sleeve 32 forms the restricted valve opening 31 and is subjected to the exhaust pressure on the one side and approximate atmospheric pressure on the discharge side. Springs 35 resist the outward movement of the sleeve in response to increases in pressure. A stop ring 36 is provided at the inner end of the sleeve limiting its inward movement under the action of the spring and the shoulder 36ª limits the outward movement of the sleeve. In order that the full area of the sleeve may be subjected to the differential pressure as between the exhaust and atmosphere openings 37 are made through the shell of the sleeve back of the restricting face at the inner end of the sleeve.

As the pressure builds up in the exhaust chamber the sleeve moves outwardly and this is utilized to control a supply controlling valve. A stem 38 extends from contact with a spider 38ª at the inner end of the sleeve through a guide bushing 39 in the supply control valve body 4 and operates against a ball valve 40 operating on a seat 41. The valve 40 is carried in a guide 42.

Steam is admitted through the passage 43 from any convenient source of supply and passes to an annular chamber 44 in the body and from this annular chamber by radial openings 45 and an axial opening 46 in a fitting 47 to the valve and from this valve by way of a passage 48 to the nozzle. The fitting 47 has a screw-threaded projection 49 by means of which the fitting may be adjusted and locked in adjustment by a nut 50. A cap 51 closes the end of the body.

In the operation of the device when the engine starts and reaches a speed creating some exhaust pressure the valve 30ª is moved under the influence of the weights 19 and the floating sleeve is also moved under the influence of the pressure, thus actuating the inlet supply valve. The supply valve through the adjustment of the fitting 47 is so adjusted that the sleeve will reach a position with relation to the valve 30ª positioned by the speed sensitive device under the desired speed to place the supply valve at a position supplying the necessary steam to effect the desired speed. The floating valve is very sensitive and accomplishes the control of the supply valve with a very slight variation in the exhaust pressure and the exhaust pressure is controlled with extreme sensitiveness by the exhaust control valve and the speed sensitive device.

It will be seen, therefore, that the speed sensitive device accomplishes this control without contact of the high speed rotating parts of the engine with relatively stationary parts forming a part of the control. The exhaust pressure is made to correspond to speed changes and then used as a factor of control. By supplementing the exhaust control with a steam supply control responsive to exhaust pressure the retarding of the exhaust is minimized so that the control is efficient as to steam consumption. The mounting of the speed sensitive device wholly within the steam passages avoids the carrying of the movement of the speed sensitive devices through the walls of the passages and thus avoids undue friction and thus permits of a very sensitive mechanism.

Difficulty is sometimes experienced with devices of this type through the breakage of some of the speed controlling members permitting the running away of the engine with a consequent injury to the parts. In the present device should the spring break it would result immediately in the slowing down of the engine rather than the speeding up and, therefore, the construction has this element of safety.

What I claim as new is:—

1. The method of controlling the speed of fluid actuated engines which consists in varying the exhaust pressure throughout a working range of pressures in response to speed changes of the engine and controlling the working speed of the engine through variations in the exhaust pressure.

2. In a fluid actuated engine, the combination of means of applying an actuating fluid thereto and exhausting the same therefrom comprising inlet and exhaust passages through which the fluid passes; and a centrifugal speed sensitive device having its members within the exhaust passage varying the exhaust resistance to vary the speed of the engine.

3. In a fluid actuated engine, the combination of a turbine rotor; means of applying an actuating fluid thereto comprising passages through which the fluid passes; and a centrifugal speed sensitive device having its members within the exhaust passage varying the exhaust resistance to vary the speed of the engine.

4. In a fluid actuated engine, the combination of means of applying an actuating fluid comprising an inlet passage and an exhaust passage; devices sensitive to the speed of the engine varying the exhaust pressure; and mechanism responsive to exhaust changes varying the inlet passage.

5. In a fluid actuated engine, the combination of means of applying an actuating fluid comprising an inlet passage and an exhaust passage; devices sensitive to the speed of the engine and arranged within the exhaust passage varying the exhaust pressure; and mechanism responsive to exhaust changes varying the inlet passage.

6. In a fluid actuated engine, the combination of means of applying an actuating fluid comprising an inlet passage and an exhaust passage; centrifugally actuated devices sensitive to the speed of the engine varying the exhaust pressures; and mechanism responsive to exhaust changes varying the inlet passage.

7. In a fluid actuated engine, the combination of a turbine rotor; means of applying an actuating fluid to the rotor comprising inlet and exhaust passages; devices sensitive to the speed of the engine varying the exhaust pressure; and mechanism responsive to exhaust changes varying the inlet passage.

8. In a fluid actuated engine, the combination of a turbine rotor; means of applying an actuating fluid to the rotor comprising inlet and exhaust passages; devices sensitive to the speed of the engine and arranged within the exhaust passage varying the exhaust pressure; and mechanism responsive to exhaust changes varying the inlet passage.

9. In a fluid actuated engine, the combination of a turbine rotor; means of applying an actuating fluid comprising an inlet passage and an exhaust passage; centrifugally actuated devices sensitive to the speed of the engine varying the exhaust pressure; and mechanism responsive to the exhaust changes varying the inlet passage.

10. In a fluid actuated engine, the combination of a turbine rotor; means of applying an actuating fluid to the rotor comprising an inlet passage and an exhaust passage; an exhaust valve carried by the rotor; speed sensitive devices actuating the valve; a floating valve member operating with the exhaust valve; and an inlet valve controlled by the floating valve member.

11. In a fluid actuated engine, the combination of a turbine rotor; means of applying an actuating fluid to the rotor comprising an inlet passage and an exhaust passage; an exhaust valve sensitive to the engine speed; a floating valve member operating with relation to the exhaust valve; and an inlet valve controlled by the floating valve member.

12. In a fluid actuated engine, the combination of a turbine rotor; means of applying an actuating fluid to the rotor comprising inlet and exhaust passages; a centrifugally actuated speed sensitive device rotating with the rotor; an exhaust controlling valve controlling the flow of the exhaust carried with the speed sensitive device; and a non-rotating valve member operating with relation to the exhaust valve.

13. The method of controlling the speed of fluid actuated engines which consists in varying the exhaust pressure of the exhaust in response to variations of speed and varying the supply of fluid to the engine in response to variations in exhaust pressure.

14. In a fluid actuated engine, the combination of means of applying actuating fluid and exhausting the fluid from the engine; and devices acting on the exhaust controlling the speed of the engine comprising speed sensitive means having a centrifugal member actuated by the engine and a centrifugal member, said means being adapted to slow the speed of the engine upon the failure of one of said members.

15. The method of controlling the speed of fluid-actuated engines which consists in admitting steam to the engine, varying the pressure of the steam in its passage through the engine in response to variations of speed and varying the supply of fluid to the engine in response to variations in pressure in the passage.

16. In a fluid-actuated engine, the combination of means of applying an actuating fluid comprising an inlet passage and an exhaust passage; devices sensitive to the speed of the engine for varying a pressure drop at a point in said passages through which the actuating fluid is passed; and mechanism responsive to such pressure drop varying the inlet passage.

17. In a fluid-actuated engine, the combination of means of applying an actuating fluid comprising an inlet passage and an exhaust passage through which the fluid passes; a valve member, one surface of which is nearer the inlet and the other of which is toward the outlet, said valve member effecting a pressure drop in the passage; a speed sensitive device controlling said valve; and mechanism controlled by said valve member controlling the inlet of the engine.

In testimony whereof I have hereunto set my hand.

SYLVESTER M. VIELE.